United States Patent
Bates et al.

(10) Patent No.: US 8,826,235 B2
(45) Date of Patent: Sep. 2, 2014

(54) STEP GRANULARITY SELECTION IN A SOFTWARE DEBUGGER

(71) Applicant: International Business Machines Corporation, Armonk, NY (US)

(72) Inventors: Cary L. Bates, Rochester, MN (US); Rodney L. Rabe, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/687,081

(22) Filed: Nov. 28, 2012

(65) Prior Publication Data

US 2013/0086555 A1  Apr. 4, 2013

Related U.S. Application Data

(63) Continuation of application No. 12/907,168, filed on Oct. 19, 2010, now Pat. No. 8,397,218.

(51) Int. Cl.
*G06F 9/44* (2006.01)

(52) U.S. Cl.
USPC ......................................................... 717/125

(58) Field of Classification Search
USPC ......................................................... 717/125
See application file for complete search history.

(56) References Cited

U.S. PATENT DOCUMENTS

| | | | | |
|---|---|---|---|---|
| 7,735,066 B1 * | 6/2010 | Myers et al. | ................... | 717/125 |
| 7,895,580 B1 * | 2/2011 | Nikolov | ........................ | 717/130 |
| 2001/0056341 A1 * | 12/2001 | Pennello et al. | ................ | 703/22 |
| 2009/0125888 A1 * | 5/2009 | Von Der Ahe et al. | ........ | 717/129 |
| 2009/0204951 A1 * | 8/2009 | Laurenti et al. | ................ | 717/128 |
| 2009/0222795 A1 * | 9/2009 | Frank et al. | .................... | 717/127 |

OTHER PUBLICATIONS

TotalView Users Guide, Version 8.7, TotalView Technologies, pp. 239-244, 2009.

* cited by examiner

*Primary Examiner* — Ryan Coyer

(74) *Attorney, Agent, or Firm* — Martin & Associates, LLC; Derek P. Martin

(57) ABSTRACT

A debugger allows a programmer to select the granularity of a line step function. Using a debugger step statement, the programmer can specify line step, statement step, or automatic selection. When the user specifies line step in the debugger statement, the debugger functions in true line step mode, where a line of source code is executed for each step. When the user specifies statement step in the debugger statement, the debugger functions in statement step mode, where a statement is executed for each step. When the user specifies automatic selection in the debugger statement, the program is analyzed, and a decision regarding whether to use line step or statement step is made based on the characteristics of the program and based on user-specified selection criteria. In this manner the function of the debugger when line stepping can vary according to the programmer's needs.

2 Claims, 8 Drawing Sheets

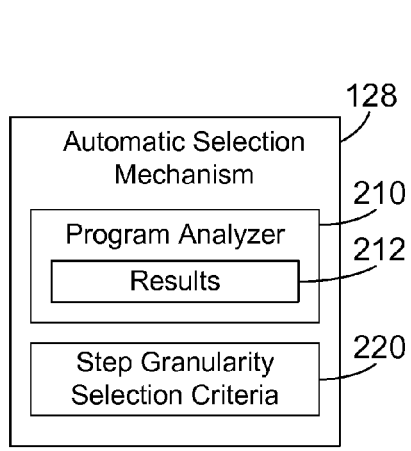

FIG. 2

```
                    Example Program   ⎱ 310 main()
{
int i,j,k;

k = 0; j = 1; i = 0;      — 320 while( k < 10 ) k++;      — 330 j = 0;                    — 340
i = 0;                    — 350
}
```

FIG. 3

```
Line Step Mode through Example Program

FDBX6421: Loaded debug data from "/u/clbates/main.dbg"
FDBX0150: Debug target is 31-bit.

(dbx64) s
stopped in main at line 7 in file "main.c" ($t1)    ⎫ 410
7 k = 0; j = 1; i = 0;                              ⎭
(dbx64) s
stopped in main at line 9 in file "main.c" ($t1)    ⎫ 420
9 while( k < 10 ) k++;                              ⎭
(dbx64) s
stopped in main at line 12 in file "main.c" ($t1)   ⎫ 430
12 j = 0;                                           ⎭
(dbx64) s
stopped in main at line 13 in file "main.c" ($t1)   ⎫ 440
13 i = 0;                                           ⎭
(dbx64) s
stopped in main at line 14 in file "main.c" ($t1)   ⎫ 450
14 }                                                ⎭
(dbx64) s
FDBX0114: program exited                            ⎬ 460
(dbx64)
```

FIG. 4

```
Statement Step Mode through Example Program

FDBX6421: Loaded debug data from "/u/clbates/main.dbg"
FDBX0150: Debug target is 31-bit.

(dbx64) s
stopped in main at line 7 in file "main.c" ($t1)      ⟩ 510
7 k = 0; j = 1; i = 0;
(dbx64) s
stopped in main at line 7 in file "main.c" ($t1)      ⟩ 520
7 k = 0; j = 1; i = 0;
(dbx64) s
stopped in main at line 7 in file "main.c" ($t1)      ⟩ 530
7 k = 0; j = 1; i = 0;
(dbx64) s
stopped in main at line 9 in file "main.c" ($t1)      ⟩ 540
9 while( k < 10 ) k++;
(dbx64) s
stopped in main at line 9 in file "main.c" ($t1)      ⟩ 541
9 while( k < 10 ) k++;
(dbx64) s
stopped in main at line 9 in file "main.c" ($t1)      ⟩ 542
9 while( k < 10 ) k++;
(dbx64) s
stopped in main at line 9 in file "main.c" ($t1)      ⟩ 543
9 while( k < 10 ) k++;
(dbx64) s
stopped in main at line 9 in file "main.c" ($t1)      ⟩ 544
9 while( k < 10 ) k++;
(dbx64) s
stopped in main at line 9 in file "main.c" ($t1)      ⟩ 545
9 while( k < 10 ) k++;
(dbx64) s
stopped in main at line 9 in file "main.c" ($t1)      ⟩ 546
9 while( k < 10 ) k++;
(dbx64) s
stopped in main at line 9 in file "main.c" ($t1)      ⟩ 547
9 while( k < 10 ) k++;
(dbx64) s
stopped in main at line 9 in file "main.c" ($t1)      ⟩ 548
9 while( k < 10 ) k++;
(continued in FIG. 6)
```

FIG. 5

Statement Step Mode through Example Program (continued from FIG. 5)

```
(dbx64) s
stopped in main at line 9 in file "main.c" ($t1)     549
9 while( k < 10 ) k++;
(dbx64) s
stopped in main at line 9 in file "main.c" ($t1)     550
9 while( k < 10 ) k++;
(dbx64) s
stopped in main at line 12 in file "main.c" ($t1)    560
12 j = 0;
(dbx64) s
stopped in main at line 13 in file "main.c" ($t1)    570
13 i = 0;
(dbx64) s
stopped in main at line 14 in file "main.c" ($t1)    580
14 }
(dbx64) s
FDBX0114: program exited                             590
(dbx64)
```

FIG. 6 dbx [-Step=Line, Stmt, Auto]

FIG. 7

STEP GRANULARITY SELECTION IN A SOFTWARE DEBUGGER

BACKGROUND

1. Technical Field

This disclosure generally relates to debuggers, and more specifically relates to stepping in debuggers.

2. Background Art

Computer systems have evolved into extremely sophisticated devices, and may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modern programming environments include a debugger that provides tools for testing and debugging a computer program. Dbx is a popular Unix-based source-level debugger. One useful feature of dbx is the ability to step through programs one source line at a time, or one machine instruction at a time. An instruction step steps one machine instruction at a time. A line step steps one source code line at a time. However, the definition of "line" within a dbx debugger can vary. For example, in some dbx debuggers, a line is defined to be a line in the source code. In others a line is a statement, and there may be multiple statements in a single line of source code. Thus, a line like a=1; b=2; results in two steps when statement level stepping is done. This can be particularly annoying when macros with multiple statements are encountered. In C and C++, a macro is a single line. For debuggers that do statement stepping when line stepping is specified, the user will have to step once for each statement in the macro. For debuggers that do true line stepping, the user will have to step only once to execute the macro.

At other times statement stepping may be desirable. Consider a loop like: while (some condition) foo( ); The way compilers expand while loops, the first instructions generated are actually not in the loop. A breakpoint used to implement a line step must be set on the very first instruction of the line. Because of this, when line stepping with a step over type of operation, the debugger will stop on this line once. Another step will complete all iterations of the loop and stop on the next line. Statement level stepping would stop on the call to foo( ) each time through the loop when a step over operation was done. Many users would find this preferable.

Known dbx debuggers implement line stepping as either a line step or a statement step, and always use this implementation whenever line stepping is specified. A programmer is thus stuck with the implementation of line stepping in each particular dbx debugger. Without a way for a programmer to specify desired line stepping modes, the user will be unable to vary the function of the debugger according to his or her needs.

BRIEF SUMMARY

A debugger allows a programmer to select the granularity of a line step function. Using a debugger step statement, the programmer can specify line step, statement step, or automatic selection. When the user specifies line step in the debugger statement, the debugger functions in true line step mode, where a line of source code is executed for each step. When the user specifies statement step in the debugger statement, the debugger functions in statement step mode, where a statement is executed for each step. When the user specifies automatic selection in the debugger statement, the program is analyzed, and a decision regarding whether to use line step or statement step is made based on the characteristics of the program and based on user-specified selection criteria. In this manner the function of the debugger when line stepping can vary according to the programmer's needs.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a block diagram that shows one suitable implementation for the automatic selection mechanism of FIG. 1;

FIG. 3 is a block diagram of an example program;

FIG. 4 is a block diagram that shows line step mode through the example program;

FIGS. 5 and 6 show statement step mode through the example program;

FIG. 7 is a database statement that allows a user to specify the step mode is line, statement, or automatic;

DETAILED DESCRIPTION

The claims and disclosure herein provide a debugger that allows a programmer to select the granularity of line stepping. Using a debugger step statement, the programmer can specify line step, statement step, or automatic selection. When the user specifies line step in the debugger statement, the debugger functions in true line step mode, where a line of source code is executed for each step. When the user specifies statement step in the debugger statement, the debugger functions in statement step mode, where a statement is executed for each step. When the user specifies automatic selection in the debugger statement, the program is analyzed, and a decision regarding whether to use line step or statement step is made based on the characteristics of the program and based on user-specified selection criteria.

Figure 1:
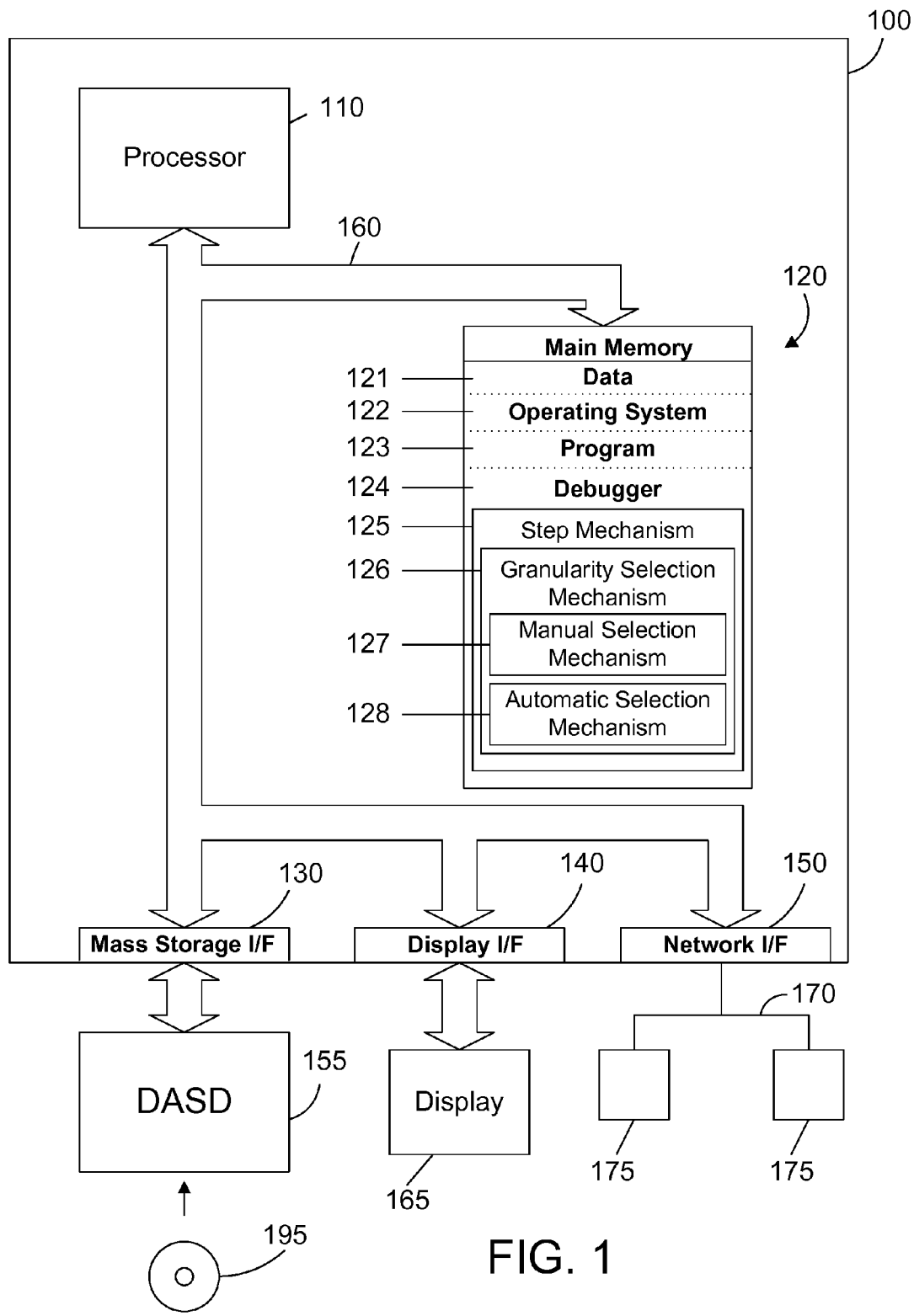
FIG. 1 is a block diagram of an apparatus that includes a granularity selection mechanism that determines an appropriate step mode for the debugger.

Referring to FIG. 1, a computer system 100 is one suitable implementation of a computer system that includes a debugger with a granularity selection mechanism. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a program 123, and a debugger 124. Data 121 represents any data that serves as input to or output from any program in computer system 100. Operating system 122 is a multitasking operating system. Program 123 is any code that needs to be debugged, whether the code is a complete application, a module, or some subset of an application or module. The debugger 124 includes a step mechanism 125 that allows the user of the debugger to step through the program 123 being debugged. The step mechanism 125 includes a granularity selection mechanism 126 that allows a user to specify a granularity of the step mechanism 125 in a database statement. The manual selection mechanism 127 sets the step mode of the step mechanism 125 to line mode when the user specifies line mode in the database statement. The manual selection mechanism 127 sets the step mode of the step mechanism 125 to statement mode when the user specifies statement mode in the database statement. When the user specifies automatic in the database statement, the step mode is determined automatically by analyzing the program 123 and comparing the program to a set of defined criteria. The step mode is then automatically set by the automatic selection mechanism 128 to either line step mode or statement step mode, depending on the results of the analysis of the program and defined criteria.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, program 123 and debugger 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the debugger 124.

Although computer system 100 is shown to contain only a single processor and a single system bus, those skilled in the art will appreciate that a granularity selection mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 2, a sample implementation for the automatic selection mechanism 128 includes a program analyzer 210 and one or more step granularity selection criteria 220.

Figure 9:
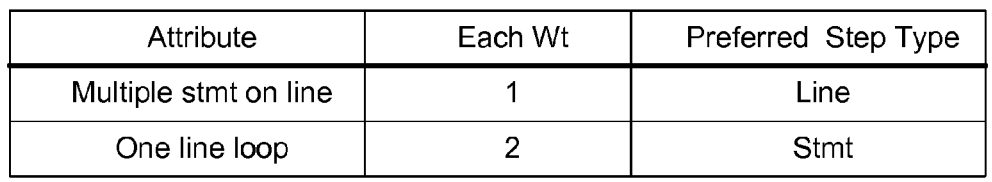
FIG. 9 is a sample table showing one suitable implementation for the step granularity selection criteria shown in FIG. 2.

The program analyzer 210 analyzes the program being debugged, and generates results 212. The automatic selection mechanism 128 then compares the results 212 of the analysis of the program being debugged that is output by the program analyzer 210 with the step granularity selection criteria 220, and automatically sets the step mode to either line or statement depending on the results 212 and the step granularity selection criteria 220. Note the step granularity selection criteria can include any suitable metric or heuristic for determining step mode of the debugger, including criteria that are currently known as well as those developed in the future. Suitable granularity selection criteria are shown in FIG. 9 to include multiple statements on one line, and one line loops.

Referring to FIG. 3, an example program 310 is shown to illustrate the concepts of line step mode and statement step mode discussed herein. This example program 310 is extremely simple, and is shown for purposes of illustration. The example program 310 includes a line at 320 that includes three statements that initialize three variables k, j and i; a line at 330 that is a one line loop; a line at 340 that sets j to zero; and a line 350 that sets i to zero.

Line step mode through the example program 310 in FIG. 3 is shown in FIG. 4. Line 320 is processed as a line even though it contains three statements at 410. The one line loop at 330 is processed as a line at 420. The line 340 is processed as a line at 430. The line 350 is processed as a line at 440. The end bracket is then encountered at 450, indicating the end of the program, so the program is exited at 460.

Statement step mode through the example program 310 in FIG. 3 is shown in FIGS. 5 and 6. Note that each statement in line 320 is processed separately, as shown at 510, 520 and 530 in FIG. 5. In addition, each iteration of the one line loop at 330 is processed separately, as shown at 540-550 in FIGS. 5 and 6. Line 340 is processed at 560. Line 350 is processed as a line at 570. The end bracket is then encountered at 580, indicating the end of the program, so the program is exited at 590.

Known debuggers, such as dbx debuggers, typically pick either line step mode or statement step mode when line stepping is selected, and do not allow changing the step granularity. This can cause problems because both line step mode and statement step mode are desirable under different circumstances. Thus, if a programmer is not concerned about a one line loop, and statement step mode is implemented by the dbx debugger when line stepping is selected by the programmer, the debugger will step on all iterations of the loop, as shown at 540-550 in FIGS. 5 and 6. This can be annoying for the programmer to have to step through so many breakpoints that are not useful. Allowing the user to manually specify step mode for line stepping, and also to specify automatic determination of step mode based on characteristics of the program, provides great flexibility that enhances the power of the debugger to provide useful information to the programmer when debugging a program.

To allow a user to either manually specify a step mode, or to select automatic selection of a step mode according to a program's characteristics, a new debugger statement is needed. Such a statement for the dbx debugger is shown in FIG. 7. The step statement in FIG. 7 includes a parameter –Step that is set to either Line, Stmt (statement), or Auto. Thus, when the user specifies the step statement dbx–Step=Line, the line stepping in the debugger will be set to line step mode. When the user specifies the step statement dbx–Step=Stmt, the line stepping in the debugger will be set to statement step mode. When the user specifies the step statement dbx–Step=Auto, the line stepping in the debugger will be set to either line step mode or statement step mode depending on the characteristics of the program determined by the program analyzer 210 in FIG. 2, and depending on the step granularity selection criteria 220 in FIG. 2.

Figure 8:
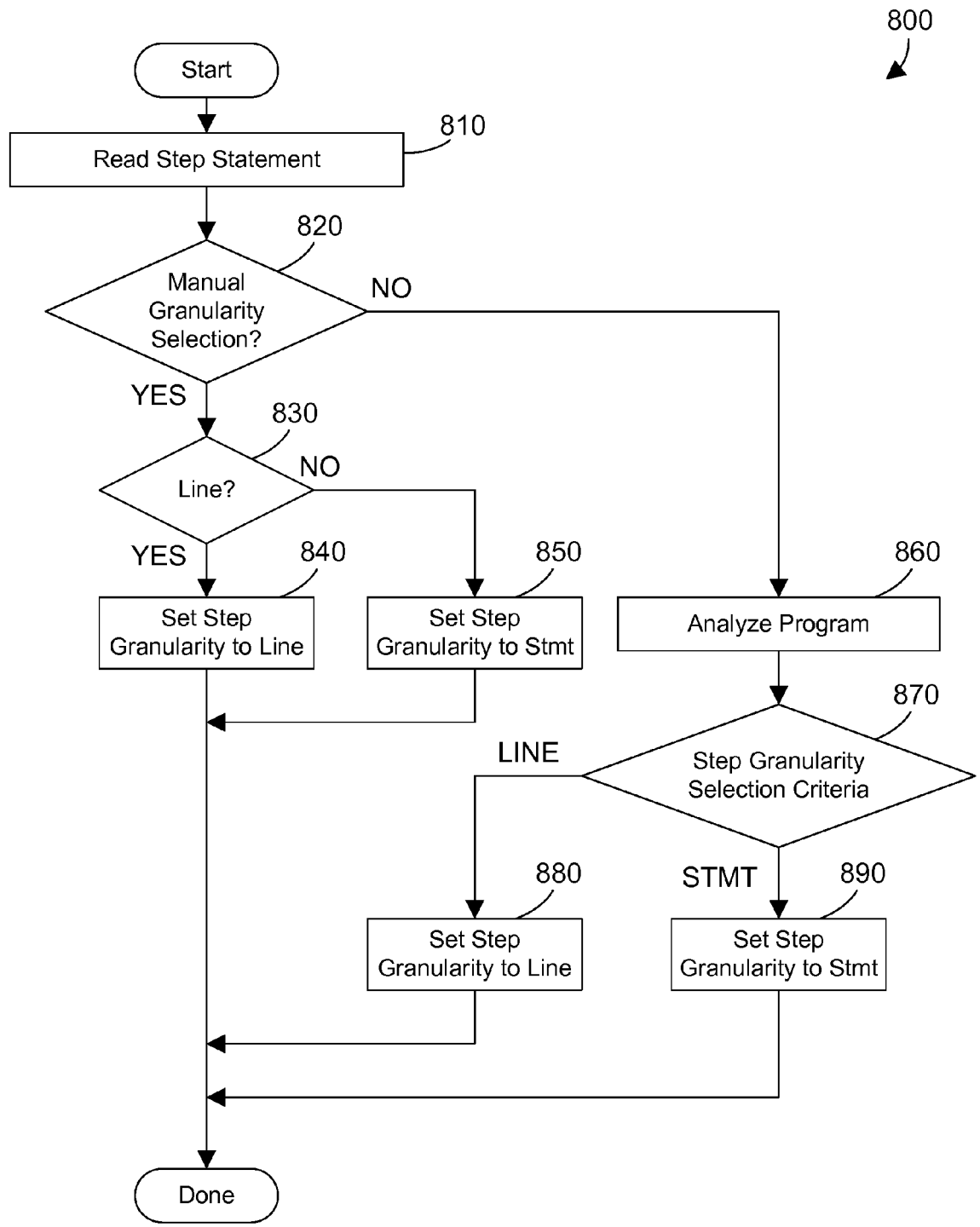
FIG. 8 is a flow diagram of a method for setting the step mode in a debugger according to a database statement as shown in FIG. 7.

Referring to FIG. 8, a method 800 for setting step mode in a debugger begins by reading a step statement (step 810). The step statement is preferably specified by the programmer, but could also be generated by software. When the step statement specifies manual granularity selection (step 820=YES), and if the step statement specifies line step mode (step 830=YES), the step granularity is set to Line (step 840), which means line step mode is selected for line stepping in the debugger. When the step statement specifies manual granularity selection (step 820=YES), and if the step statement specifies statement step mode (step 830=NO), the step granularity is set to Stmt (step 850), which means statement step mode is selected for line stepping in the debugger. When the step statement read in step 810 does not specify manual granularity selection (step 820=NO), this means the step statement specifies automatic granularity selection. As a result, the program is analyzed (step 860), and the results of the analysis are compared to step granularity selection criteria (step 870). When the analyzed program and the step granularity selection criteria specify LINE mode (step 870=LINE), the step granularity is set to Line (step 880), which means line step mode is selected for line stepping in the debugger. When the analyzed program and the step granularity selection criteria specify STMT mode (step 870=STMT), the step granularity is set to Stmt (step 890), which means statement step mode is selected for line stepping in the debugger.

A detailed example is now given to illustrate some of the concepts discussed above. Referring to FIG. 9, a table 900 includes data that includes step granularity selection criteria, such as 220 in FIG. 2. For this specific example, the two attributes (criteria) listed in the table are 1) Multiple stmt on one line; and 2) one line loop. Each attribute has a corresponding "each weight" (Each Wt), and preferred step type. We see from the table 900 that multiple statements on line has an Each Wt of 1 and a preferred step type of Line. One line loop has an Each Wt of 2 and a preferred step type of Stmt. The criteria specified in table 900 are used to determine whether to automatically specify line mode or step mode when performing line stepping in the debugger.

Figure 10:
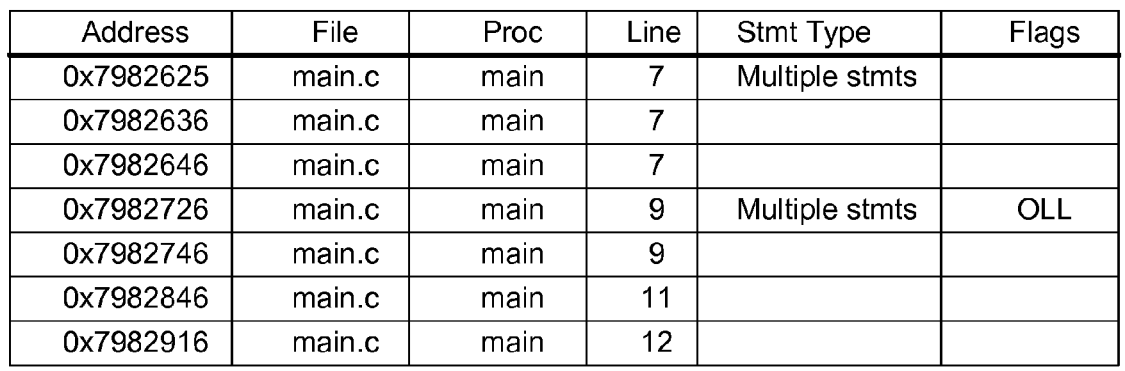
FIG. 10 is a sample instruction line table showing results of analyzing a program.

FIG. 10 shows a line table 1000 that includes characteristics of the program being debugged. Table 1000 is one suitable example of results 212 that could be output by the program analyzer 210 in FIG. 2. Addresses 0x7982625 and 0x7982726 both specify multiple statements at the statement type. In addition, address 0x7982726 also has a one line loop (OLL) flag set to indicate this is a one line loop at this address. We can now analyze the program characteristics in table 1000 in FIG. 10 with respect to the step granularity selection criteria in table 900 in FIG. 9 to determine whether the granularity selection mechanism (126 in FIG. 1) in the debugger should automatically set the step mode to line step mode or statement step mode for line stepping in the debugger.

Figure 11:
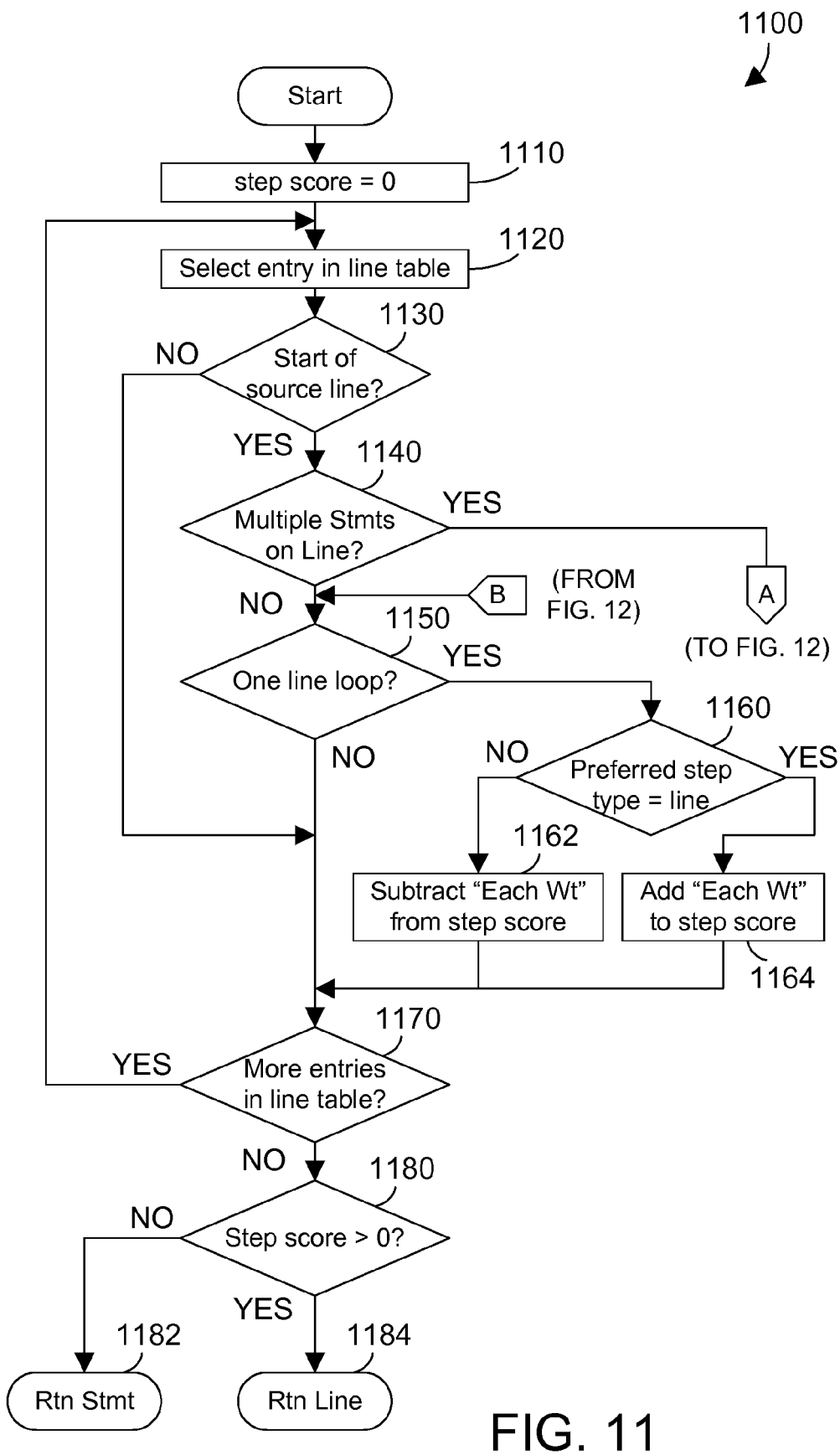
FIGS. 11 and 12 are a flow diagram of a method for using the granularity selection criteria in FIG. 9 and the results of analyzing the program in FIG. 10 to automatically determine a step mode for a debugger.
Figure 12:
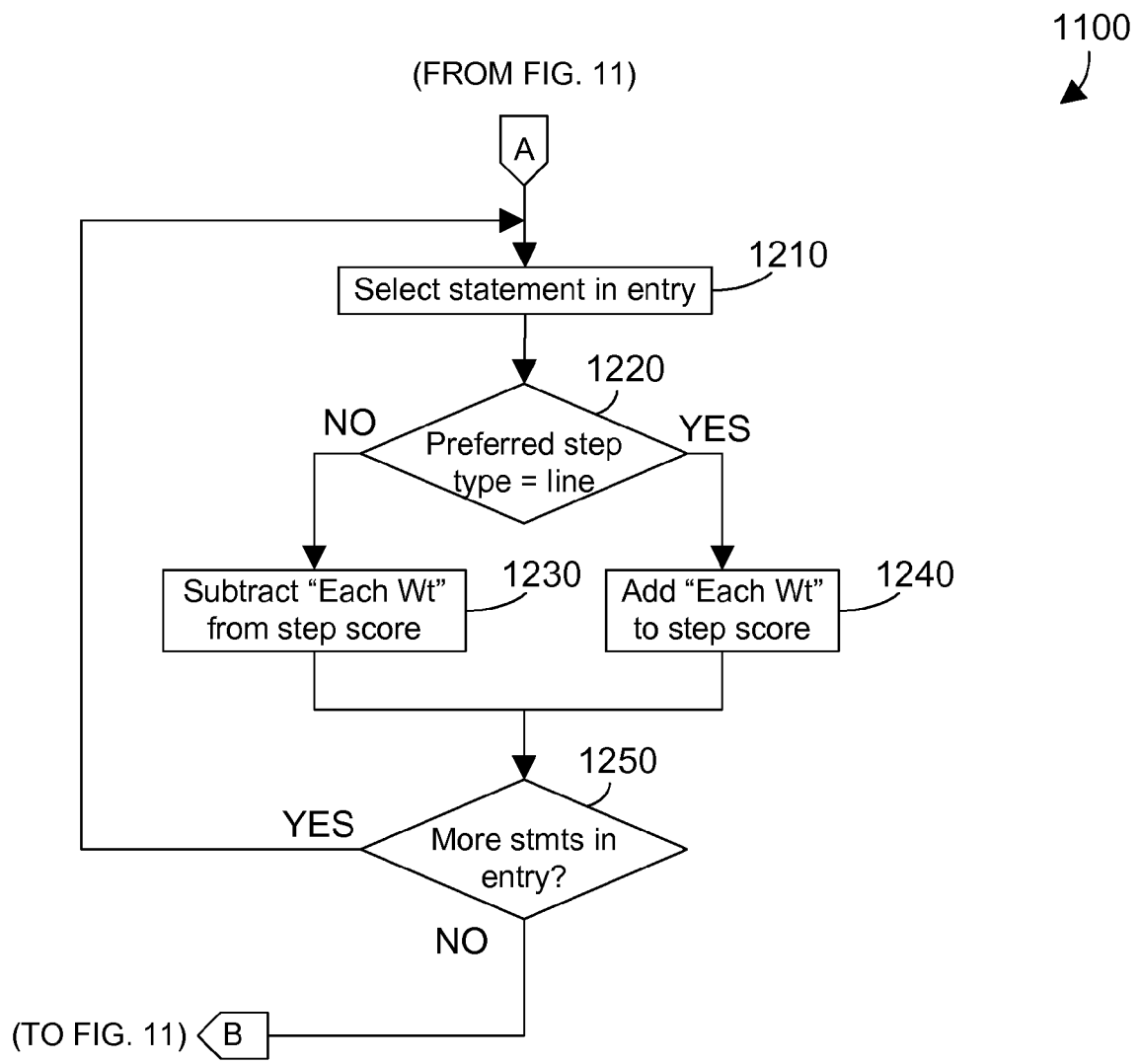

One suitable method for determining whether to automatically set the step mode to line step mode or statement step mode is shown as method 1100 in FIGS. 11 and 12. First, a step score is initialized to zero (step 1110). An entry in the line table is selected (step 1120). If the selection is not the start of a source line (step 1130=NO), if there are more entries in the line table (step 1170=YES), the next entry is selected (step 1120), and method 1100 continues. If the selection is the start of a source line (step 1130=YES), and if there are not multiple statements on the line (step 1140=NO), and if the selection is not a one line loop (step 1150=NO), if there are more entries in the line table (step 1170=YES), the next entry is selected (step 1120), and method 1100 continues.

If there are multiple statements on the line (step 1140=YES), control transfers to point A in FIG. 12. A statement in the entry is selected (step 1210). If the preferred step type for the statement is line (step 1220=YES), add the "Each Wt" to the step score (step 1240). If the preferred step type for the statement is stmt (step 1220=NO), subtract the "Each Wt" from the step score (step 1230). If there are more statements in the entry to process (step 1250=YES), method 1100 loops back to step 1210 and continues until there are no more statements in the entry to process (step 1250=NO). At this point, control passes to point B in FIG. 11.

If the selected entry in the line table is a one line loop (step 1150=YES), and if the preferred step type is line (step 1160=YES), add the "Each Wt" to the step score (step 1164). If the preferred step type is stmt (step 1160=NO), subtract the "Each Wt" from the step score (step 1162). When there are more entries in the line table to process (step 1170=YES), method 1100 loops back to step 1120 and continues until there are no more entries in the line table to process (step 1170=NO). If the step score is greater than zero (step 1180=YES), method 1100 returns "Line" (step 1184), which means the automatic selection mechanism 128 in FIG. 1 will automatically set the step mode to line step mode. If the step score is not greater than zero (step 1180=NO), method 1100 returns "Stmt" (step 1182), which means the automatic selection mechanism 128 in FIG. 1 will automatically set the step mode to statement step mode.

The example in FIGS. 9-12 illustrate one specific way the automatic selection mechanism 128 can automatically specify a step mode based on the characteristics of the program received from the program analyzer 210 and based on specified step granularity selection criteria 220. Note that other ways are equally within the scope of the disclosure and claims herein. For example, the step mode could be automatically selected based on whether or not the programmer debugging the program wrote the program. Thus, if the program was written by the programmer debugging the program, the step mode could be automatically set to statement step mode, but if the program was written by someone else, the step mode could be automatically set to line step mode. The disclosure and claims herein expressly extend to any suitable program characteristics and any suitable step granularity selection criteria that could be used to automatically set step mode of a debugger, whether currently known or developed in the future.

The disclosure and claims disclose a debugger that includes a granularity selection mechanism that allows a programmer to specify via a step statement a manual selection of step mode, or to specify automatic selection of step mode based on characteristics of the program and based on one or more step granularity selection criteria. When the programmer specifies a step statement with manual selection of line step mode, the debugger selects line step mode for line stepping. When the programmer specifies a step statement with manual selection of statement step mode, the debugger selects statement step mode for line stepping. When the programmer specifies a step statement with automatic selection of step mode, the program is analyzed and the results of the analysis are compared to one or more step granularity selection criteria. The granularity selection mechanism will then automatically select either line step mode or statement step mode depending on the characteristics of the program and the step granularity selection criteria. By allowing a programmer to manually specify step mode for line stepping, or to specify automatic selection of step mode based on some defined criteria, the power and flexibility of a debugger is greatly enhanced.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a program residing in the memory;
   a debugger residing in the memory and executed by the at least one processor, the debugger debugging the program, the debugger comprising:
   a step mechanism for stepping through the program while debugging the program, the step mechanism comprising a granularity selection mechanism that reads a step statement from a user that includes a parameter that specifies one of line step mode, statement step mode, and automatic selection of step mode according to at least one selection criterion, and when the parameter in the step statement specifies line step mode, the granularity selection mechanism sets step mode of the debugger to line step mode, and when the parameter in the step statement specifies statement step mode, the granularity selection mechanism sets the step mode of the debugger to statement step mode, and when the parameter in the step statement specifies automatic selection of step mode, the granularity selection mechanism performs an analysis of the program that determines whether the program satisfies at least one selection criterion, and specifies line step mode when the at least one characteristic of the program satisfies the at least one selection criterion, and specifies statement step mode when the at least one characteristic of the program does not satisfy the at least one selection criterion, wherein the at least one selection criterion comprises multiple statements on a line.

2. An apparatus comprising:
   at least one processor;
   a memory coupled to the at least one processor;
   a program residing in the memory;
   a debugger residing in the memory and executed by the at least one processor, the debugger debugging the program, the debugger comprising:
   a step mechanism for stepping through the program while debugging the program, the step mechanism comprising a granularity selection mechanism that reads a step statement from a user that includes a parameter that specifies one of line step mode, statement step mode, and automatic selection of step mode according to at least one selection criterion, and when the parameter in the step statement specifies line step mode, the granularity selection mechanism sets step mode of the debugger to line step mode, and when the parameter in the step statement specifies statement step mode, the granularity selection mechanism sets the step mode of the debugger to statement step mode, and when the parameter in the step statement specifies automatic selection of step mode, the granularity selection mechanism performs an analysis of the program that determines whether the program satisfies at least one selection criterion, and specifies line step mode when the at least one characteristic of the program satisfies the at least one selection criterion, and specifies statement step mode when the at least one characteristic of the program does not satisfy the at least one selection criterion, wherein the at least one selection criterion comprises a one line loop.

* * * * *